US007275155B1

(12) United States Patent
Aull (10) Patent No.: US 7,275,155 B1
(45) Date of Patent: Sep. 25, 2007

(54) CHAIN OF TRUST PROCESSING

(75) Inventor: Kenneth W. Aull, Fairfax, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 904 days.

(21) Appl. No.: 09/704,417

(22) Filed: Nov. 1, 2000

Related U.S. Application Data

(60) Provisional application No. 60/229,336, filed on Sep. 1, 2000.

(51) Int. Cl.
*H04L 9/00* (2006.01)
(52) U.S. Cl. ...................................... 713/157; 713/176
(58) Field of Classification Search ........ 713/156–157, 713/165, 193–194, 202, 155, 176, 200; 705/51, 705/75; 380/277
See application file for complete search history.

(56) References Cited

U.S. PATENT DOCUMENTS

| | | | | |
|---|---|---|---|---|
| 5,218,637 | A * | 6/1993 | Angebaud et al. | 713/173 |
| 5,373,561 | A * | 12/1994 | Haber et al. | 713/157 |
| 5,659,616 | A * | 8/1997 | Sudia | 705/76 |
| 5,922,074 | A * | 7/1999 | Richard et al. | 713/200 |
| 6,108,788 | A * | 8/2000 | Moses et al. | 713/201 |
| 6,122,742 | A * | 9/2000 | Young et al. | 713/201 |
| 6,160,891 | A * | 12/2000 | Al-Salqan | 380/286 |
| 6,233,341 | B1 * | 5/2001 | Riggins | 380/277 |
| 6,249,873 | B1 * | 6/2001 | Richard et al. | 713/200 |
| 6,304,974 | B1 * | 10/2001 | Samar | 713/201 |
| 6,389,136 | B1 * | 5/2002 | Young et al. | 380/28 |
| 6,490,358 | B1 * | 12/2002 | Geer et al. | 380/286 |
| 6,549,626 | B1 * | 4/2003 | Al-Salqan | 380/286 |
| 6,553,393 | B1 * | 4/2003 | Eilbott et al. | 715/513 |
| 6,625,734 | B1 * | 9/2003 | Marvit et al. | 713/201 |
| 6,636,975 | B1 * | 10/2003 | Khidekel et al. | 713/202 |
| 6,643,774 | B1 * | 11/2003 | McGarvey | 713/155 |
| 6,658,568 | B1 * | 12/2003 | Ginter et al. | 713/193 |

(Continued)

*Primary Examiner*—Ayaz Sheikh
*Assistant Examiner*—Christian LaForgia
(74) *Attorney, Agent, or Firm*—Tarolli, Sundheim, Covell & Tummino LLP (57) ABSTRACT

A technique for automatically obtaining a second certificate for a user using a first certificate includes accessing a server platform using a user's server and the first certificate of the user to create a connection that authenticates both the user's server identity via a server certificate of the user server and the user's identity via the user's first certificate. A secure data channel is then created between the server platform and the user platform. A request for the second certificate is forwarded by the user from the user server to the server platform and the server platform then generates the second certificate. The first certificate may be a signature certificate and the second certificate may be an encryption certificate. The first certificate may be an expiring signature certificate and the second certificate may be a replacement signature certificate. The first certificate may be a signature certificate and the second certificate may be a replacement encryption certificate to replace an expiring encryption certificate. The first certificate may be a signature certificate and the second certificate may be one of either the user's current encryption certificate or an expired encryption certificate of the user. Thus, the first certificate may be used as a mechanism for establishing a "chain of trust" that can be used to obtain all other certificates without requiring the manual intervention of an enterprise officer, thereby considerably reducing the time and expense of obtaining additional certificates for a user.

11 Claims, 7 Drawing Sheets

U.S. PATENT DOCUMENTS

| | | | |
|---|---|---|---|
| 6,675,296 B1 * | 1/2004 | Boeyen et al. | 713/156 |
| 6,785,729 B1 * | 8/2004 | Overby et al. | 709/229 |
| 6,816,900 B1 * | 11/2004 | Vogel et al. | 709/225 |
| 6,842,523 B1 * | 1/2005 | Niwa et al. | 380/286 |
| 2002/0029337 A1 * | 3/2002 | Sudia et al. | 713/176 |

* cited by examiner

CHAIN OF TRUST PROCESSING

CROSS-REFERENCE TO RELATED APPLICATIONS

This application claims the benefit of Provisional Application Ser. No. 60/229,336, filed in the U.S. Patent and Trademark Office on Sep. 1, 2000, the contents of which are expressly incorporated by reference herein.

BACKGROUND OF THE INVENTION

1. Field of the Invention

The present invention relates to digital certificates in a PKI (Public Key Infrastructure). More particularly, the present invention relates to using a first certificate of a user to authenticate the user is identity in subsequent certificate processing.

2. Description of the Related Art

A PKI is a set of policies, procedures, and software that permit an organization to generate, issue, and manage public/private cryptographic keys in a manner that allows users to reliably determine the identity of the owner of each public/private key pair. The key components of a PKI include: (1) a mechanism for reliably conveying the identity of a key pair's owner to the end user; (2) software applications for generating and managing key pairs that support this mechanism; (3) a set of procedures for generating and revoking key pairs that ensures that the identity of the owner can be reliably determined; and (4) a set of policies defining who may obtain public/private key pairs and identifying how each pair may be used.

As to component (1) of a PKI, most PKIs establish that the user owns a key pair by using an electronic document called a digital certificate. Digital certificates contain information identifying the owner of the key pair, the public component of the pair, and the period of time for which the certificate is valid. The digital certificate also identifies technical information about the key itself, such as the algorithm used to generate the key and the key length.

Certificates are generated by organizations that are responsible for verifying the identity of individuals, or in some instances, other organizations to which certificates are being issued. The identity of the certifying organization, referred to as a certificate authority, is recorded in each certificate, which is then signed using a private key known only to the certificate authority itself. This allows users to verify both the integrity of the certificate and the identity of the authority that issued it.

Certificate authorities generally employ any of a number of different commercially available software products to manage the creation, renewal, and revocation of certificates. These Certificate Management Systems (CMS) take information obtained through the user registration process, create a certificate, and sign it with the certificate authority's private key. The applicable CMS software maintains a database of all of the certificates that it has issued, and their statuses. The CMS is also responsible for revoking certificates, and for publishing a certificate revocation list that identifies the date on which each certificate was revoked, and the reason for the revocation. This information allows relying users (that is, those individuals or systems that are performing encryption or signature verification actions based on certificates) to review the status of a certificate, to assess its usability. A list of distribution points from which the CRL can be obtained are identified in the certificate itself.

In issuing a certificate, a certificate authority is stating that is has verified that the public key that appears in the certificate (and, by extension, the corresponding private key) belongs to the individual listed in the certificate. The integrity with which the registration process operates is therefore of great importance. The process must provide mechanisms for reliably identifying an individual and for verifying that the public key listed in the certificate belongs to that individual. Equally important, the certificate authority must provide procedures for revoking certificates in the event that the private key is compromised. A compromised private key calls into question the entire basis for trusting a certificate, since more than one individual may be using that private key to sign documents, or more than one individual may be able to decrypt documents encrypted using the corresponding public key.

Relying individuals and organizations must have a clear understanding of their certificate authority's operation processes. As a result, most certificate authorities publish a Certificate Practice Statement (CPS) that details the processes for registering users, issuing certificates, renewing certificates and revoking certificates. The CPS is normally published on the certificate authority's website.

Certificates often contain additional information that identifies an individual as a member of a particular organization and perhaps the role that they play in the organization. For example, the certificate may identifying the certificate holder as being either an employee of a company or a customer or subcontractor or supplier of the company. The policies determining who is eligible to hold a certificate are therefore important if individuals and organizations are to rely upon this information. These policies govern the overall operation of the certificate authority.

In other disadvantageous PKI, every time a user needs a digital certificate, it is almost as if the user has never received any previous certificates. That is, the user needs to authenticate his or her identity all over again. Since these other PKI's use manual processing for authenticating the identity of the user, this approach tends to be labor-intensive, thereby resulting in high costs for obtaining digital certificates in that every subsequent digital certificate is just as expensive to issue as the first certificate.

SUMMARY OF THE INVENTION

An object of the present invention is to obtain an initial digital certificate for a user and then use this initial certificate to authenticate the user's identity for all subsequent certificate processing.

Another object of the present invention is to automatically obtain a second certificate for user using a first certificate by accessing a server platform using a user's server and the first certificate of the user to create a connection that authenticates both the user's server identity via a server certificate of the user server and the user's identity via the users for certificate. A secure data channel is created between the server platform and the user server and a request for the second certificate is forwarded by the user from the user server to the server platform. The server platform then generates the second certificate without requiring any manual intervention by an enterprise officer.

The first certificate may be a signature certificate while the second certificate may be an encryption certificate.

The first certificate may be an expiring signature certificate while the second certificate may be a replacement signature certificate.

The first certificate may be a signature certificate while the second certificate may be a replacement encryption certificate to replace an expiring encryption certificate.

The first certificate may be a signature certificate while the second signature certificate may be one of either the user's current encryption certificate or an expired encryption certificate of the user.

BRIEF DESCRIPTION OF THE DRAWINGS

The foregoing and a better understanding of the present invention will become apparent from the following detailed description of example embodiments and the claims when read in connection with the accompanying drawings, all form a part of the disclosure of this invention. While the foregoing and following written and illustrated disclosure focuses on disclosing example embodiments of the invention, it should be clearly understood that the same as by way of illustration and example only and the invention is not limited thereto. The spirit and scope of the present invention are limited only by the terms of the appended claims.

The following represents a brief description of the drawings, wherein.

DETAILED DESCRIPTION

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. Lastly, well-known components and connections have not been shown within the drawing figures for simplicity of illustration and discussion and so is not to obscure the invention.

Figure 1:
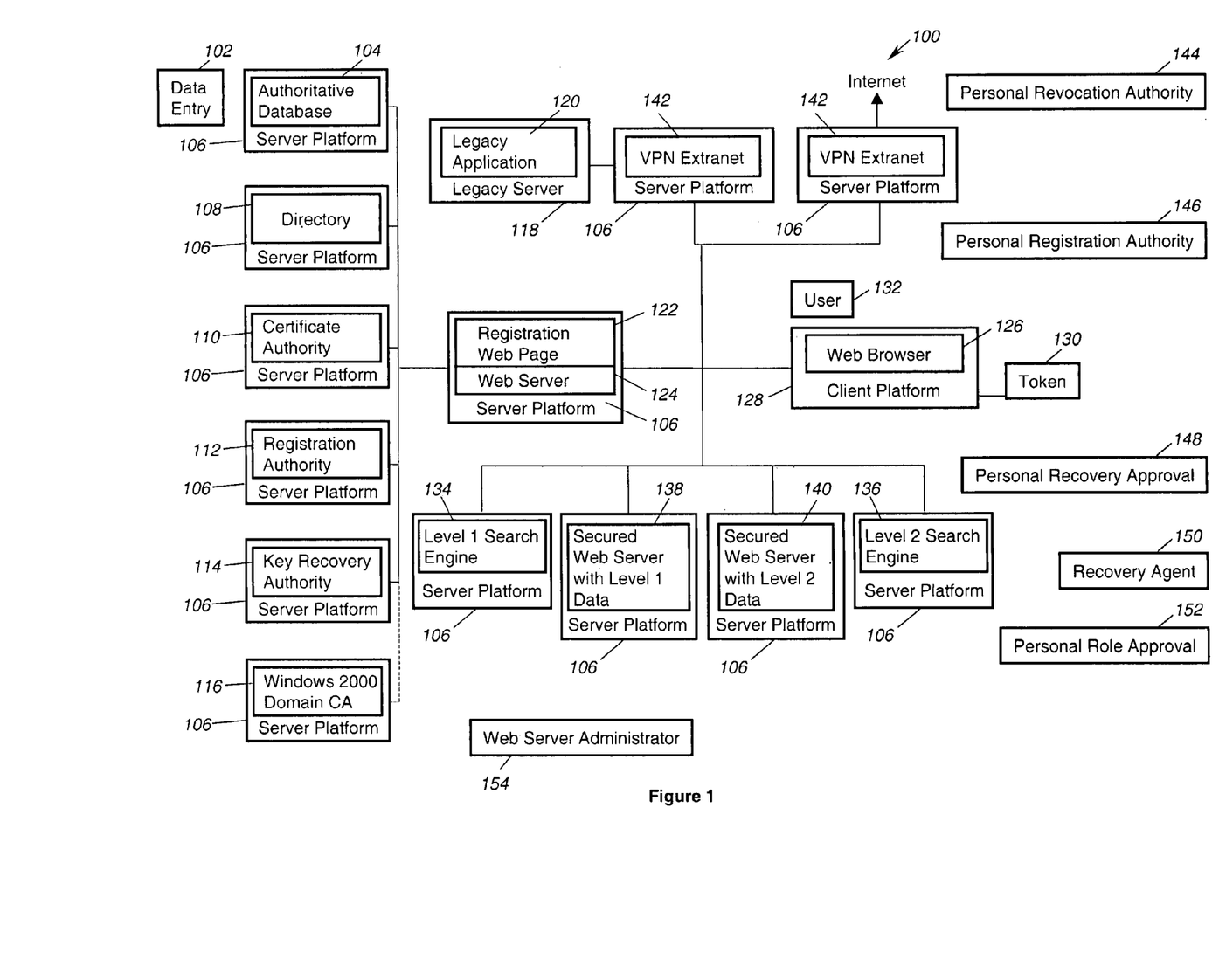
FIG. 1 is a block diagram illustrating an exemplary architecture of a network in which the PKI processes of the present invention may be practiced.

FIG. 1 illustrates an exemplary architecture of a network 100 in which the Public Key Infrastructure (P.K.I) processes of the present invention may be practiced. However, it should be understood that the present invention is not limited to the network 100 of FIG. 1. The network 100 includes data entry 102, which performs a data entry function for authoritative database 104, which is resident on the server platform 106. A server platform 106 is referred to in this description, but it should be understood that the present invention is not limited to any particular server architecture. The server platform 106 may be, without limitation, a UNIX or Windows NT server. The authoritative database 104 contains information about members of the group or enterprise for which PKI services in accordance with the present invention are performed. The present invention is not limited by the structure of the group enterprise for which information is stored in the authoritative database 104. The authoritative database 104 information includes, without limitation, the name, address, telephone numbers, manager's name, employee identification, etc., of the members of the group or enterprise. Directory 108 has the structure of the database but is optimized for fast look-up of information stored therein rather than fast data entry. The data in the directory 108 is not changed frequently but is required to be accessed rapidly and functions on-line as a fast phone book, containing reference information about the members of the group or enterprise stored in the authoritative database 104. Certificate authority 110 is off-the-shelf software executed on server platform 106, providing storage of certificates and related information used by the present invention as described in more detail hereinafter. Registration authority 112 is also off-the-shelf software executable on server platform 106 regarding registration performed by the present invention as described in more detail hereinafter. Key authority 114 is also off-the-shelf server software which is executable on server platform 106 for recovering keys from members of the group or enterprise as described in more detail hereinafter. Windows 2000 Domain CA 116 may use certificates provided by the present invention for a single sign-on to the network 100 of FIG. 1. Legacy server 118 executes legacy application programs 120. The legacy server may be, without limitation, a main frame, minicomputer, workstation, or other server hosting legacy software applications that are designed to be run on PKI processes in accordance with the present invention. The legacy applications 120 are accessible on the client side by a custom client 128 such as an emulator or custom database Graphic User Interface (GUI). Examples of emulators are terminal emulators of an IBM 3270 or terminal emulators of a vt 100. Registration web page 122, which may be one or more pages, functions as the user interface to the network 100 of FIG. 1. Web server 124 is a software application which serves Web Pages, such as Web Page 122 or other HTML outputs, to a web browser client which may be, without limitation, Apache or a Microsoft Internet Information Server. Web browser 126 is resident on client platform 128 which may be any user computer. Web browser 126 is a client software application for browsing web pages such as but not limited to HTML or XML protocols or other protocols. The Web browser 126 is programmed to operate with PKI certificates issued by the certificate authority 110. Examples of web browsers which have this capability are Netscape Navigator and the Microsoft Internet Explorer. The token 130 is a smart card, USB (United Serial Bus), or other hardware token capable of generating, storing, and using PKI certificates. A user 132 is a person using the network 100. A user 132 transitions through a number of states which include a new user, current user, and a former user who no longer is a member of the group or enterprise. The network 100 is described with reference to two levels of security, but the number of the levels of security is not a limitation of the present invention, with each level corresponding to a different security requirement. The level 1 search engine 134 is a search engine which is permitted to search through the network 100 but is allowed access to only level 1 data, which is the lowest level of security and may be, without limitation, data which is freely distributable. Level 2 data may be considered to be proprietary. Level 2 search engine 136 is a search engine which is allowed to search through both level 1 and level 2 data. A level N search engine (not illustrated) is a search engine which is allowed to search through servers possessing data levels 1 through N. A secured level server with level 1 data 138 is a Web server containing only level 1 data, which is secured so that users must have level 1 access (at least) to access the server. A secured Web server with level 2 data 140 is a Web server that contains level 2 data which has been secured so that users must have level 2 access, with level 2 users having access to both level 1 and level 2 servers. A secured Web server with level N data (not illustrated) is a Web server that contains level N data which is accessible by a user with level N or above access. VPN Extranet 142 is a software application which functions as a network gateway which, as illustrated, may be either to legacy server 118 and legacy application 120 or to an external network such as the Internet. Personal registration authority 144 is a person who is in charge of revocation of members from the network 100. Personal registration authority 146 is a person who is in charge of registration of members in the network 100. Personal recovery approval 148 is a person in charge of obtaining recovery of certificates. A Recovery Agent 150 is a person who performs recovery of certificates and may only recover a certificate if the certificate has first been designated as recoverable by another person. Personal role approval 152 is a person who approves different role functions within the network 100. A Web server administrator is in charge of various web functions in the network 100.

Figure 2:
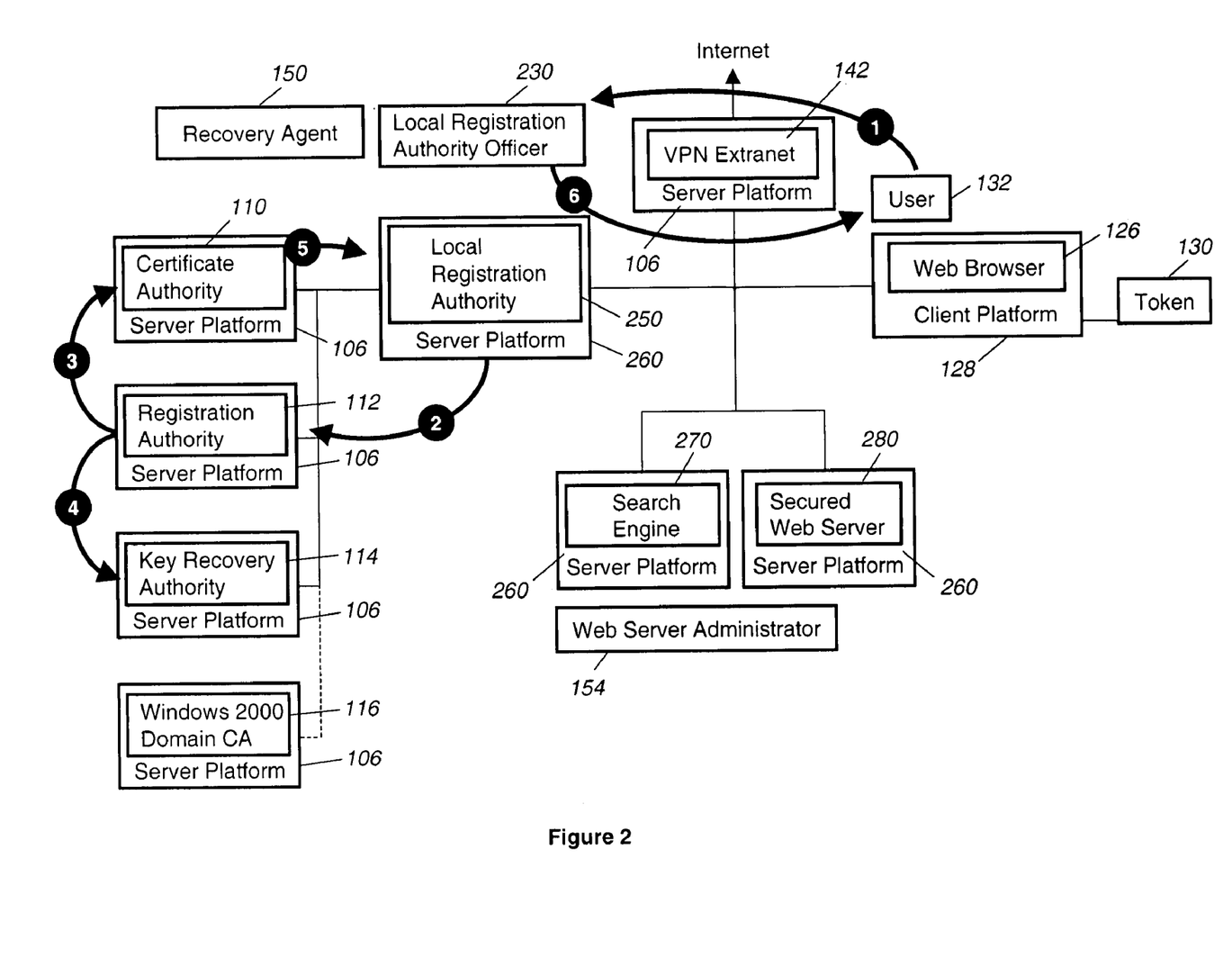
FIG. 2 is a partial block diagram illustrating the steps performed by a manual technique for generating a signature certificate.

FIG. 2 illustrates a partial block diagram of a network bearing some features in common with that of the network 100 of FIG. 1. FIG. 2 has been provided to enable the discussion of a manual technique for generating a signature certificate. Elements in FIG. 2 which correspond to those of FIG. 1 have been labeled with the same designation numbers. Note that the level 1 and level 2 search engines 134 and 136 of FIG. 1 have been replaced by the single search engine 270 and the secured Web servers 138 and 140 of FIG. 1 have been replaced by the single secured Web server 280.

In step 1 of FIG. 2, the user 132 physically presents a photo ID to the Local Registration Authority Officer (LRAO) 230. In step 2, the LRAO 230 then uses software contained in the local registration authority 250 to signal the registration authority 112 to register the new user 132. In step 3, a public/private key pair is generated by either the local registration authority 250 software or the registration authority 112 software, depending on the products chosen and depending on how they've been configured. The public key is sent to the certificate authority 110 to be signed, thereby generating a "certificate". In step 4, a backup copy of the private key may also optionally be sent to the key recovery authority 114. In step 5, the user's certificate is forwarded to the local registration authority 250. In step 6, the LRAO 230 copies the certificate (including the private key) onto a floppy disk or hardware token 130 or other storage medium and then physically hands the stored certificate and private key to the user 132. The LRAO 230 must manually mark the database or log with the pedigree of the certificate.

In other disadvantageous PKI's, replacing an expiring signature certificate is unfortunately similar to the process illustrated in FIG. 2 for generating a signature certificate. That is, referring to FIG. 2, in step 1, the user 132 presents a photo ID to the LRAO 230 in order to authenticate the identity of the user 132. Then, in step 2, the LRAO 230 uses LRA 250 software to signal the RA 112 to create a new signature certificate for the user 132. In step 3, the public/private key pair is generated by either the LRA 250 or the RA 112 software, depending on the products chosen and depending on how they have been configured. The public key is sent to the CA 110 to be signed, thereby generating a signature certificate. Optionally, depending on the products chosen and depending on how they have been configured, a backup copy of the private key may also be sent to the KRA 114. In step 5, the user's signature certificate is provided to the LRA 250. In step 6, the LRAO 230 copies the signature certificate including the private key onto a floppy disk, hardware token, or other storage medium. The LRAO 230 then hands the signature certificate and private key to the user 132. Thus, replacing an expiring signature certificate requires the same amount of time and expense as providing the signature certificate initially.

Figure 3:
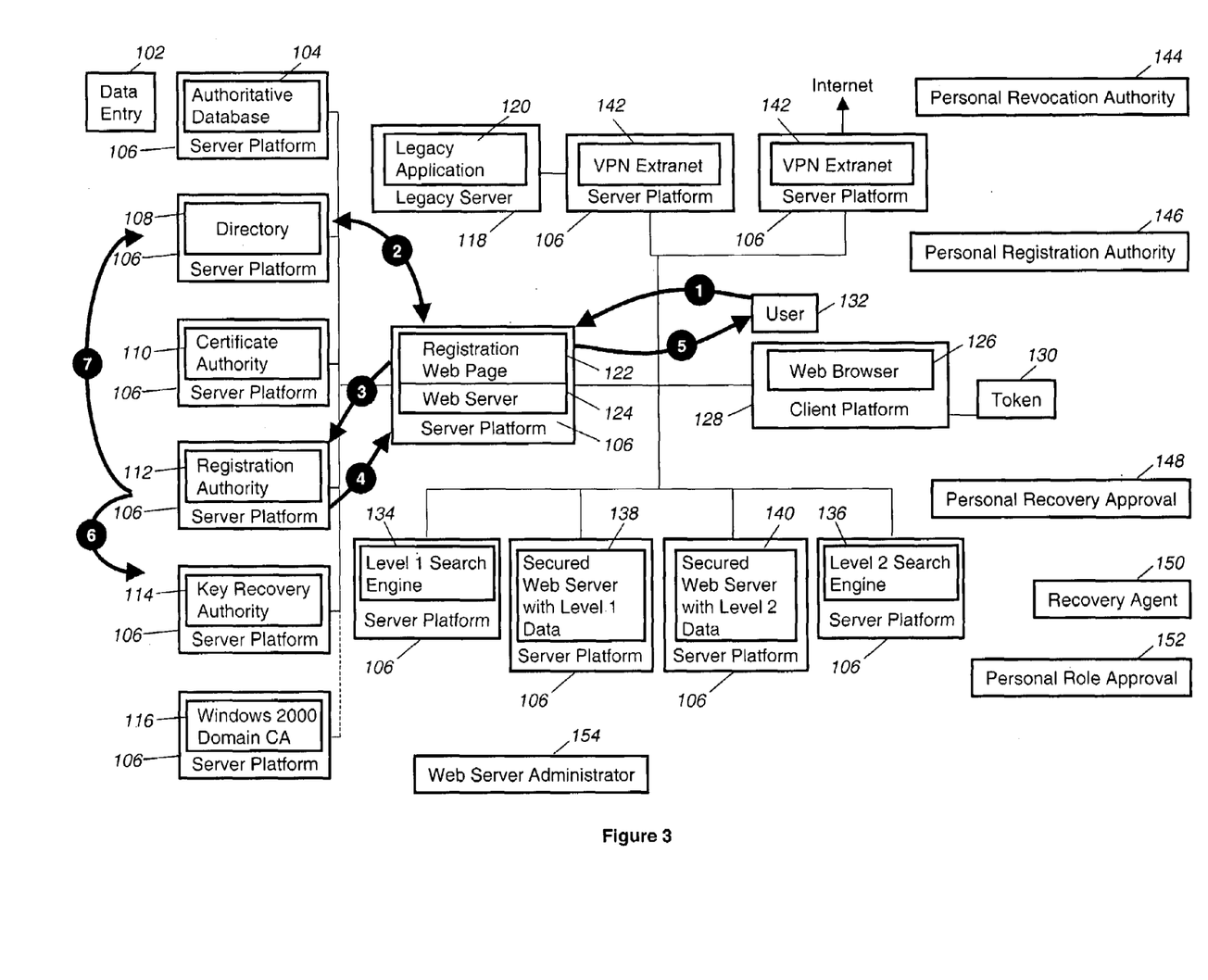
FIG. 3 is a block diagram illustrating an example of obtaining an encryption certificate in accordance with a present invention.

Referring to FIG. 3, it is assumed that the user 132 is already listed in the directory 108 and already has a signature certificate. In step 1, a user 132 accesses the Registration Web Page 122 contained in the Registration Web server 124 using his or her signature certificate. The user's signature certificate is used to create a connection that authenticates both the server identity via a server certificate and the user's identity via the user's signature certificate. Any encryption scheme is then used to create a secure data channel between the Registration Web server 124 and the user 132. The user 132 then requests an encryption certificate from the Registration Web server 124. In step 2, the Registration Web server 124 queries the directory 108 to ensure that the user is still a member of the enterprise and to ensure that the user does not already have an encryption certificate, (since the user cannot have two concurrently valid encryption certificates). In step 3, the Registration Web server 124 signals the RA (Registration Authority) 112 to generate a private/public key pair. In step 4, the RA 112 uses the encrypted channel to send the private key back to the user 13 to either directly or via the Registration Web server 124. In step 5, the RA 112 sends the public key to the CA (Certificate Authority) 110 to be signed by the CA 110. In step 6, a backup copy of the private key may be sent to the KRA (Key Recovery Authority) 114. In step 7, the CA 110 signs the public key and sends the signed certificate to the directory 108. Note that no enterprise officer was needed to obtain the encryption certificate since the "chain of trust" was used to authenticate the user via the user's signature certificate so as to obtain the encryption certificate.

Figure 4:
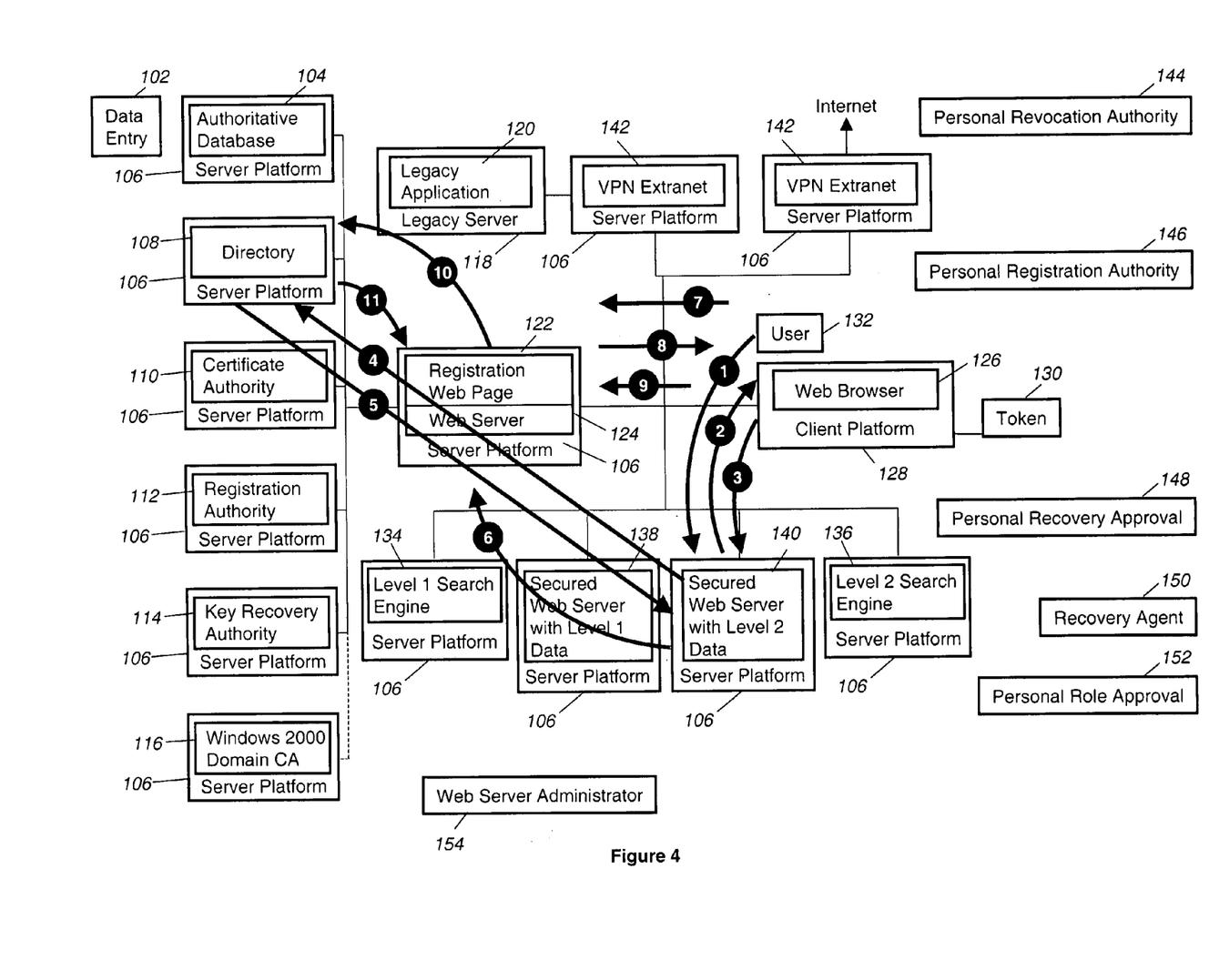
FIG. 4 is a block diagram illustrating an example of replacing an expiring signature certificate in accordance with the present invention.

An example of replacing an expiring signature certificate in accordance with the present invention will now be explained with reference to FIG. 4. In step 1, a user 132 attempts to access a server 140, for example. In step 2, the server 140 requests the user's signature to authenticate the user's identity. In step 3, the user 132 presents a signature to the server 140 and in step 4, the server 140 queries the directory 108 to verify that the user 132 is allowed access to the server 140. In step 5, the directory 108 responds with a yes or no answer. If the answer is yes, then the user 132 is granted access to the server 140. In step 6, the server 140 also checks the expiration date of the user's signature certificate. If the expiration date is near, for example, within one month, then the server 140 redirects the user 132 to the Certificate Renewal Web Page 122 on the Registration Web Server 124.

In step 7, the user 132 attempts access to the Registration Web Server 124. It is to be noted that the Registration Web Server 124 is normally set up so as not to allow a user to replace an existing signature certificate unless the existing signature certificate of the user is near its expiration date. Furthermore, if the pedigree of a user's signature certificate has been tracked, different users may access different registration Web pages on the Registration Web Server 124, depending on what level of signature certificate they possess. That is, a user with a level 2 certificate may access a registration Web Page that can be accessed only by holders of level 2 certificates.

In step 8, the Registration Web Server 124 requests the user's signature so as to authenticate the user identity and in step 9, the user 132 presents the signature to the Server 124. In step 10, the Server 124 queries the directory 108 to verify that the user 132 is allowed to access the Registration Web Server 124 and in step 11, the directory 108 responds with a yes or no answer. If the answer is yes, then the user 132 is granted access to the Server 124 and the user 132 requests replacement or renewal of the signature certificate. The subsequent steps include the Registration Web Server 124 signaling the RA 112 to re-register the user 132 and the RA 112 signaling the Web browser 126 on the client platform 128 to generate a private/public key pair and the public key is then sent to the CA 110 to be digitally signed and the signed certificate with public key is then sent from the CA 110 to the directory 108. A copy of the public key may also optionally be sent back to the Web browser 126 from the CA 110.

Note that in the above-noted procedure, it was not necessary for the user 132 to come in face-to-face contact with the LRAO 230 nor was it necessary for the LRAO 230 to be involved in the replacement of the expiring signature certificate. Thus, the above-noted procedure is much quicker and far cheaper than that of the manual procedure required by other disadvantageous PKIs.

In other disadvantageous PKI's, replacing an expiring encryption certificate is the same as the process noted above with regard to replacing an expiring signature certificate in earlier PKI's. That is, it is necessary for the LRAO to be involved with the user to replace a user's expiring encryption certificate. Accordingly, replacing a user is expiring encryption certificate in earlier PKIs required the same amount of time and expense as providing the encryption certificate initially.

On the other hand, replacing an expiring encryption certificate in accordance with the present invention is considerably simpler and less expensive since no intervention by an LRAO is necessary.

Figure 5:
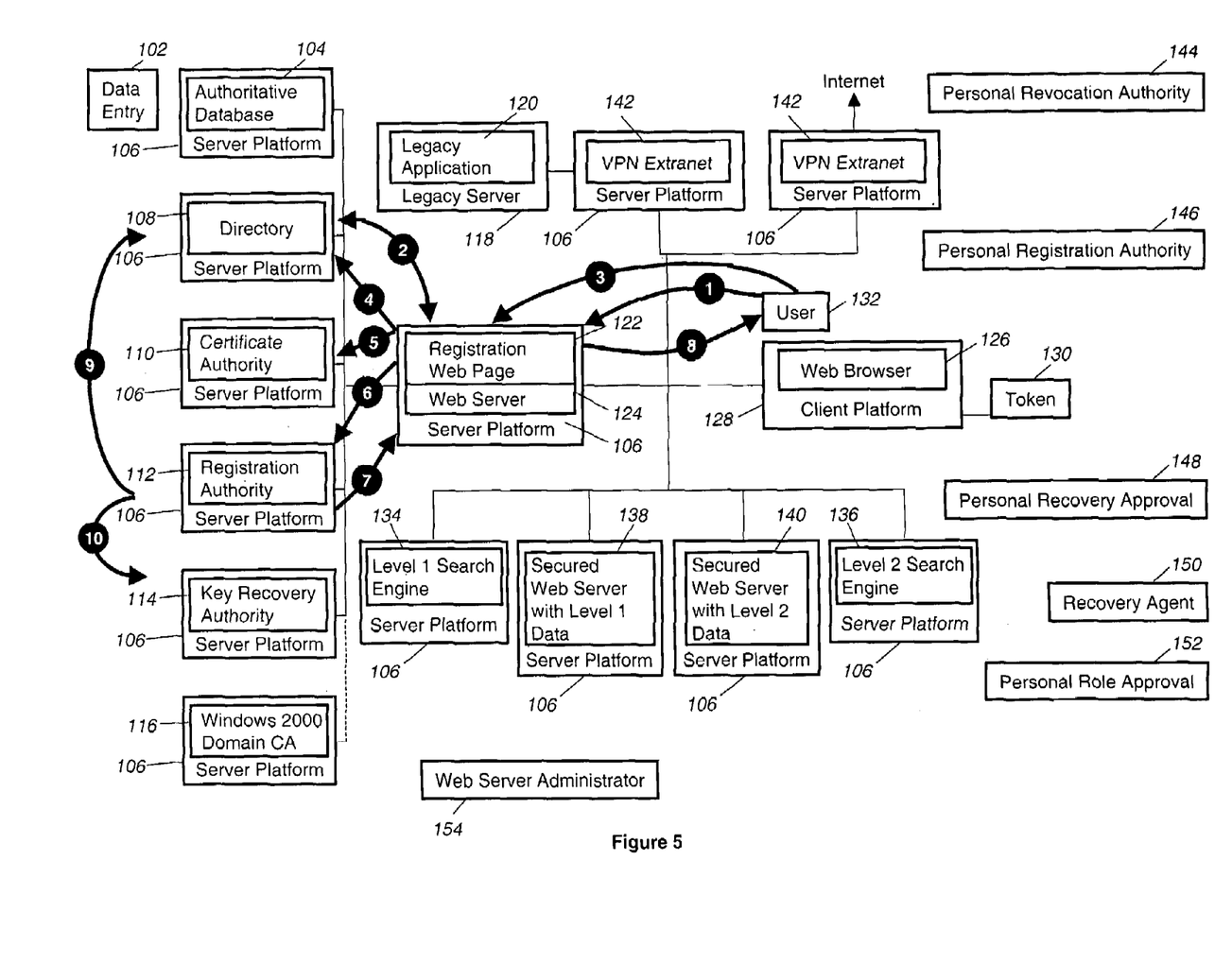
FIG. 5 is a block diagram illustrating an example of replacing an expiring encryption certificate in accordance with the present invention.

An example of replacing an expiring encryption certificate in accordance with the present invention will now be explained with reference to FIG. 5. In step 1, a user 132 accesses the Registration Web Server 124 to view the Registration Web Page 122 using his or her signature certificate. The user's signature certificate is used to create a connection that authenticates both the server identity via a server certificate and the user's identity via the user's signature certificate. Any commonly used encryption scheme may be used to create a secure data channel between the Web Server 124 and the user 132. The user 132 requests an encryption certificate from the Registration Web Server 124. In step 2, the Registration Web Server queries the directory 108 to insure that the user 132 is still a valid member of the enterprise. In step 3, the user 132 requests the Registration Web Server 124 to revoke the existing encryption certificate. This is necessary in view of the assumption that a user may not have two concurrently valid encryption certificates. In step 4, the Registration Web Server 124 signals the directory 108 that the user's encryption certificate has been revoked and in step 5, the Registration Web Server 124 signals the CA 110 that the user's encryption certificate has been revoked. In step 6, the Registration Web Server 124 signals the RA 112 to generate a private/public key pair and in step 7 the RA 112 uses an encrypted channel to send the private key back to the user 132 either directly or via the Registration Web Server 124. In step 8, the RA 112 send the public key to the CA 110 to be signed by the CA and in step 9, the CA 110 signs the public key and sends the signed public key and the signed certificate to the directory 108. A backup copy of the private key may also be sent to the Key Recovery Authority 114.

Recovering old copies of now-expired encryption certificates in other disadvantageous PKIs is expensive in that the recovery must be performed manually since other PKIs do not take advantage of the fact that the recovery process can be automated by exploiting the strong authentication of the user's signature certificate.

Figure 6:
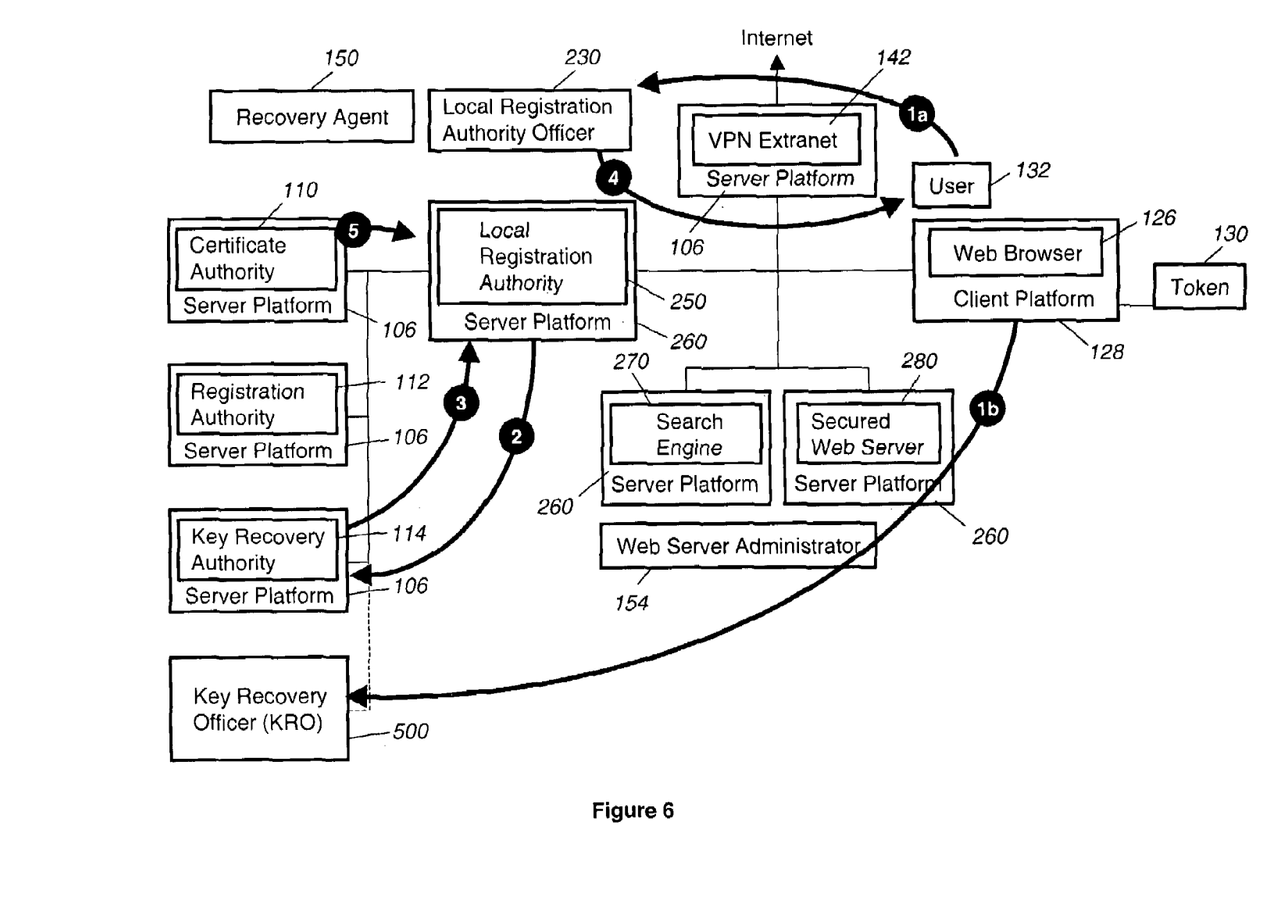
FIG. 6 is a block diagram illustrating the steps performed by a manual technique for user recovery of encryption certificates.

FIG. 6 illustrates the manual user recovery of encryption certificates in accordance with other disadvantageous PKIs. Namely, a user 132 approaches an enterprise officer, such as an LRAO 230 as shown in step 1$a$ or a KRO (Key Recovery Officer) 500 as shown in step 1$b$. The choice of enterprise officer depends on the specific PKI. For the purpose of discussion, it is assumed that the LRAO 230 is the chosen enterprise officer. In step 2, the LRAO 230 uses LRA 250 software to signal the KRA 114 to recover a copy of the old encryption certificate for the user. The user's certificate is provided to the LRA 250 in step 3. In step 4, the LRAO 230 copies the certificate onto a floppy disk, hardware token, or other storage medium and then hands the certificate to the user 132.

Figure 7:
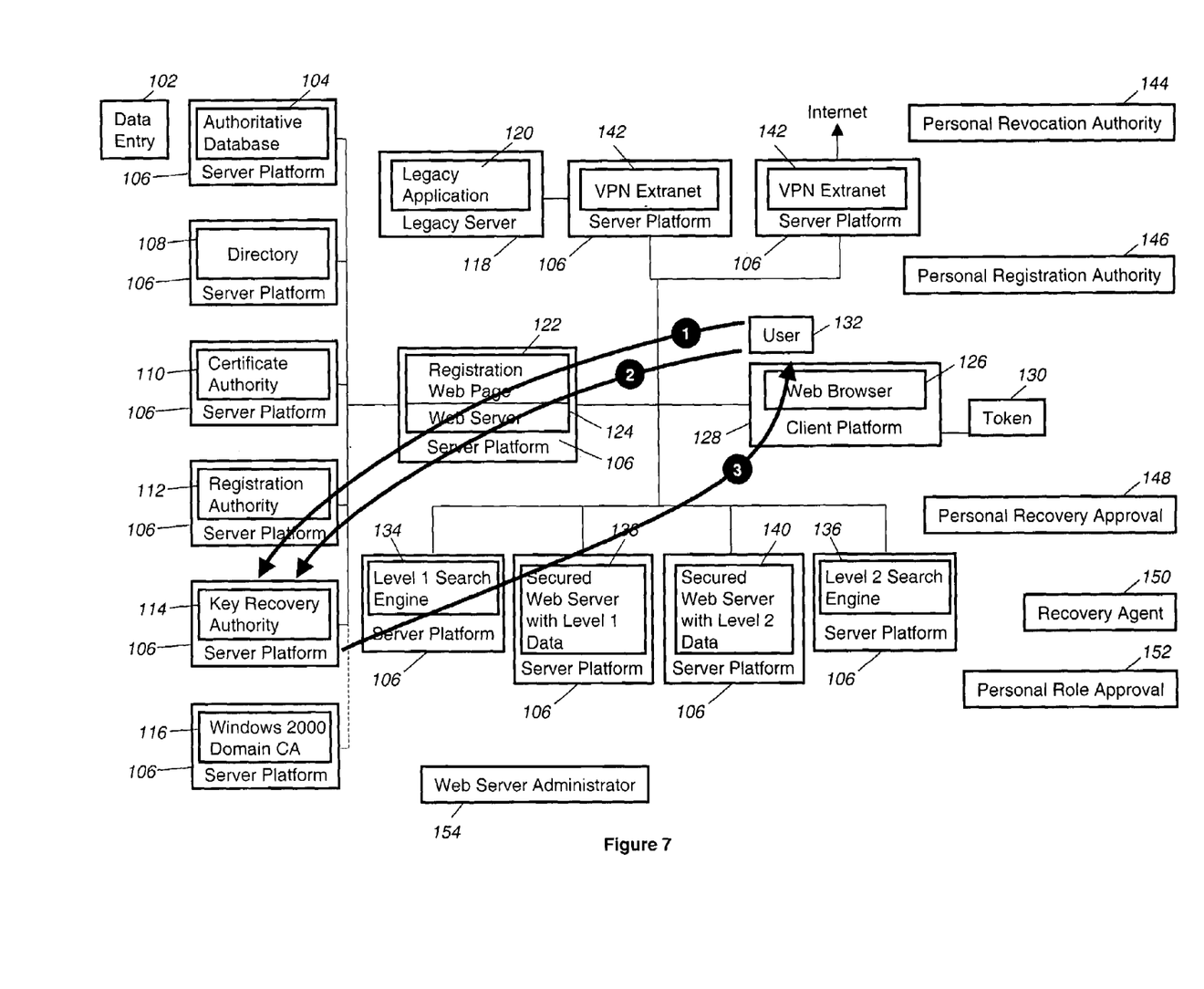
FIG. 7 is a block diagram illustrating an example of user recovery of encryption certificates in accordance with the present invention.

FIG. 7 illustrates an example of user recovery of encryption certificates in accordance with the present invention. It is assumed that the user 132 already exists in the directory 108 and it is also assumed that the user has a signature certificate and an encryption certificate.

In step 1, the user 132 accesses the KRA 114 via the Registration Web Server 124 using his or her signature certificate. The signature certificate is used to create a connection to the KRA 114 that authenticates both the server identity via a server certificate and the user's identity via the user's signature certificate. Any encryption scheme may be used to create a secure data channel between the server and the user. In step 2, the user 132 requests recovery of an encryption certificate from the KRA 114. The user 132 can either recover his or her current encryption certificate or an expired encryption certificate of the user 132. The KRA 114 uses the secure channel to deliver the requested encryption certificate to the user 132. In this fashion, the user 132 can recover both current and expired encryption certificates without requiring the manual intervention by an enterprise officer needed in other disadvantageous PKIs.

Thus, in accordance with the present invention, a secure manual procedure may be used to issue an initial digital certificate to a user and then, that initial certificate may be used to authenticate the user's identity for also subsequent certificate processing including but not limited to obtaining, replacing, and recovering certificates.

If the user already processes a signature certificate, the signature certificate can be used to strongly authenticate the user's identity and to encrypt a transmission for one particular purpose, namely, to create a onetime secure channel via which the encryption certificate's private key can be exchanged between the user and a KRA.

A secure channel is necessary so that the encryption certificate's private key will not be compromised. However, since a secure channel can not be realized via the encryption certificate since the encryption certificate has not been generating yet, the signature certificate is used to encrypt.

Stated simply, in accordance with the present invention, the initial signature certificate may be used as a mechanism for establishing a "chain of trust" that can be used to obtain all other certificates.

This concludes the description of the example embodiments. Although the present invention has been described with reference to a number of illustrative embodiments thereof, it should be understood that numerous other modifications and embodiments can be devised by those skilled of the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled of the art.

For example, the particular arrangement of elements illustrated in the drawing figures is by no means unique. Furthermore, the various server platforms may either be combined or separated to suit specific needs. Still furthermore, one enterprise officer may serve more than one function or vice versa.

What is claimed is:

1. A method of automatically obtaining a second certificate for a user in a Public Key Infrastructure (PKI) enterprise using a first certificate, the method comprising:

accessing a registration server using a user's server and the first certificate of the user to create a connection that authenticates both the user's server identity via a server certificate of the user server and the user's identity via the user's first certificate;

creating a secure data channel between the registration server and the user server;

forwarding a request for the second certificate from the user server to the registration server;

determining in the registration server that the user is entitled to the second certificate by ensuring that the user is still a member of the PKI enterprise and ensuring that the user does not already have the second certificate;

forwarding a request from the registration server to an authority to generate a private/public key pair;

sending the private key to the user from the authority via the secure data channel;

sending the public key from the authority to another authority to be signed; and forwarding the second certificate from the another authority to a directory.

2. The method of claim 1, further comprising sending a backup copy of the private key from the authority to a key recovery authority.

3. The method of claim 1, wherein the first certificate comprises a signature certificate.

4. The method of claim 3, wherein the second certificate is an encryption certificate, and wherein creating a secure data channel comprises encrypting a transmission between registration server and the user server using the signature certificate.

5. The method of claim 1, wherein the second certificate comprises an encryption certificate.

6. The method of claim 1, wherein the first certificate comprises an expiring signature certificate and the second certificate comprises a replacement signature certificate.

7. The method of claim 1, wherein the first certificate comprises a signature certificate and the second certificate comprises a replacement encryption certificate.

8. The method of claim 1, wherein the first certificate comprises a signature certificate and the second certificate comprises one of either the user's current encryption certificate or an expired encryption certificate of the user.

9. The method of claim 1, further comprising revoking the first certificate upon determining that the user is entitled to the second certificate.

10. The method of claim 9, further comprising signaling both the directory and the another authority that the first certificate has been revoked.

11. The method of claim 1, wherein accessing a registration server comprises tracking a pedigree of the user's first certificate to access a registration web page having a level of security that is commensurate with the pedigree of the user's first certificate.

* * * * *